United States Patent
Santucci

(10) Patent No.: US 10,876,653 B2
(45) Date of Patent: Dec. 29, 2020

(54) LASER PIPE POSITIONING SYSTEM

(71) Applicant: Nicholas Santucci, Lake in the Hills, IL (US)

(72) Inventor: Nicholas Santucci, Lake in the Hills, IL (US)

( * ) Notice: Subject to any disclaimer, the term of this patent is extended or adjusted under 35 U.S.C. 154(b) by 215 days.

(21) Appl. No.: 16/172,468

(22) Filed: Oct. 26, 2018

(65) Prior Publication Data

US 2019/0128445 A1 May 2, 2019

Related U.S. Application Data

(60) Provisional application No. 62/577,211, filed on Oct. 26, 2017.

(51) Int. Cl.
| | |
|---|---|
| *F16L 1/10* | (2006.01) |
| *F16L 1/028* | (2006.01) |
| *F16L 1/06* | (2006.01) |
| *E02F 1/00* | (2006.01) |
| *E03F 3/06* | (2006.01) |
| *G01S 19/14* | (2010.01) |

(52) U.S. Cl.
CPC ............... *F16L 1/10* (2013.01); *E02F 1/00* (2013.01); *E03F 3/06* (2013.01); *F16L 1/028* (2013.01); *F16L 1/06* (2013.01); *G01S 19/14* (2013.01)

(58) Field of Classification Search
CPC ........................................................ F16L 1/10
USPC ................................................... 33/286, 529
See application file for complete search history.

(56) References Cited

U.S. PATENT DOCUMENTS

| | | | | |
|---|---|---|---|---|
| 4,497,551 A | * | 2/1985 | Lapeyre | G03B 15/006 33/1 A |
| 5,095,629 A | * | 3/1992 | Klemer | G01C 15/02 33/293 |
| 5,568,265 A | * | 10/1996 | Matthews | G01B 11/27 33/286 |
| 6,124,935 A | * | 9/2000 | Matthews | G01C 15/008 33/286 |
| 6,205,670 B1 | * | 3/2001 | Webb | G01C 15/008 33/354 |
| 2001/0034944 A1 | * | 11/2001 | Cunningham | G01C 15/008 33/286 |
| 2009/0033921 A1 | * | 2/2009 | Loftis | G01B 11/27 356/138 |
| 2010/0005670 A1 | * | 1/2010 | Tsai | G01R 29/105 33/228 |
| 2012/0117813 A1 | * | 5/2012 | Stevenson | G01C 15/002 33/286 |
| 2012/0297635 A1 | * | 11/2012 | Mickow | G01C 15/002 33/228 |

(Continued)

*Primary Examiner* — George B Bennett
(74) *Attorney, Agent, or Firm* — Scherrer Patent & Trademark Law, P.C.; Stephen T. Scherrer; Monique A. Morneault

(57) ABSTRACT

The present invention relates to a GPS-guided laser pipe positioning system and methods of using the same. More specifically, a target marker is placed a distance from a laser beam source and the target marker has a GPS tracker thereon, wherein the laser beam source tracks the precise location of the target marker through the GPS tracker. The laser beam is then aimed at the location of the GPS tracker, or at a location an offset distance, such as displaced vertically downward under the ground such that the laser beam is aimed at the location within a trench for positioning pipe therein.

20 Claims, 2 Drawing Sheets

(56) References Cited

U.S. PATENT DOCUMENTS

2014/0115907 A1\* 5/2014 Gamon ................ G01C 15/004
  33/286
2015/0268045 A1\* 9/2015 Dusha .................. G01C 21/165
  33/228

\* cited by examiner

LASER PIPE POSITIONING SYSTEM

The present invention claims priority to U.S. Provisional Pat. App. No. 62/577,211, titled "GPS-Guided Laser Pipe Positioning System," filed Oct. 26, 2017, which is incorporated herein by reference in its entirety.

TECHNICAL FIELD

The present invention relates to a laser pipe positioning system and methods of using the same. More specifically, a target marker is placed a distance from a laser beam source and the target marker has a GPS tracker thereon, wherein the laser beam source tracks the precise location of the target marker through the GPS tracker. The laser beam is then aimed at the location of the GPS tracker, or at a location an offset distance, such as displaced vertically downward under the ground such that the laser beam is aimed at the location within a trench for positioning pipe therein.

BACKGROUND

Laying pipe for different applications, such as for sewers, rainwater run-off, or other like applications, is often difficult. First, excavations are generally planned and a trench is excavated for the start of a run of pipe. However, the excavation and direction of the ongoing trench, and the pipe that is subsequently positioned within the trench must be carefully planned otherwise pipes may not align. Pipes typically are in sections that are secured together when disposed underground. As such, the pipes must be precisely positioned linearly so that the pipes can easily connect together without leaks or gaps. Further, pipes must be precisely positioned as they are typically associated with another structure, such as a roadway, sewer run-off risers, manholes, grates and the like.

For example, a rainwater run-off sewer system typically utilizes a series of pipes to catch rainwater through grates in or adjacent a roadway. The rainwater typically runs off the roadway and into the pipes therebeneath. Thus, the pipes must remain in alignment with the roadway so that the rainwater may be easily and quickly removed from the roadway and traverse the pipes to its destination, which may typically be a river, stream, other waterway, or a water treatment facility for treatment prior to release.

In the past, complicated structures and sighting cord or string was used in an attempt to precisely position pipes within a trench. Typically, a batten structure was built above ground with the sighting cord or string running above the trench between positions within which the pipe was to be disposed beneath ground. A plumb bob was used to align the pipe with the sighting cord or string within a dug trench. This system was often time-consuming to construct and difficult to work with. Specifically, it was often difficult to dig a trench and position pipe with the complicated batten structure above ground. Moreover, because the sighting cord or string was above ground, and the plumb bob was used to align the sighting cord or string with the pipe, variances in any portion of the system were often disastrous.

Modern systems eliminate the sighting cord or string and utilize a laser beam that is precisely linear within the trench itself. When a pipe run is started, a laser beam at or near the start of the run of pipe is positioned and aligned toward a stake that is above ground a distance from laser beam. Typically, a person above ground communicates with a person below ground, and with the use of a plumb bob and sight, informs the person below ground how to set the laser beam within the trench. Specifically, the laser beam is sighted to aim at the direction of the stake but vertically offset below ground to provide a precise visual indicator as to where the subsequent trench should be dug and subsequent pipe should be positioned.

However, errors can be caused by improper alignment or sighting of the stake by the person above ground and improper usage of the plumb bob for positioning of the laser beam. Since the stake is typically a relatively long distance from the start of the pipe run, any error in sighting can cause a serious misalignment of the laser beam within the trench. In addition, once a laser beam is set at the start of a pipe run, it is meant to remain undisturbed so that the laser beam can continue to provide the visual indicator of where to dig and where to position the pipe within the trench. However, oftentimes, lasers can move, either due to being bumped or jostled by users, or due to movement of ground through natural and man-made actions. For example, in the process of digging the subsequent trench and positioning the subsequent pipe, machinery may cause earth to compact, or may cause vibrations that may misalign the laser beam. If not detected, differences in laser beam position can cause subsequent pipe to be incorrectly positioned. And if detected, time must be taken to ensure that the laser beam remains in proper alignment with the stake a distance away.

A need, therefore, exists for an improved laser-guided positioning system for positioning pipes. More specifically, a need exists for a laser-guided positioning system that minimizes positioning errors when the laser-guided positioning system is utilized for positioning pipes.

Moreover, a need exists for an improved laser-guided positioning system that may utilize GPS tracking of a marker so that a laser beam may remain in precise alignment with the marker. In addition, a need exists for an improved laser-guided positioning system for positioning pipes within a trench that removes or minimizes errors that may be caused by improper sighting by users thereof.

Further, a need exists for an improved laser-guided positioning system for positioning pipes within a trench that is easy to set up and utilize. Still further, a need exists for an improved laser-guided positioning system for positioning pipes within a trench that can self-correct when misaligned, due to movement of the laser beam by human or natural causes.

SUMMARY OF THE INVENTION

The present invention relates to a GPS-guided laser pipe positioning system and methods of using the same. More specifically, a target marker is placed a distance from a laser beam source and the target marker has a GPS tracker thereon, wherein the laser beam source tracks the precise location of the target marker through the GPS tracker. The laser beam is then aimed at the location of the GPS tracker, or at a location an offset distance, such as displaced vertically downward under the ground such that the laser beam is aimed at the location within a trench for positioning pipe therein.

To this end, in an embodiment of the present invention, a GPS-guided laser pipe positioning system is provided. The system comprises a laser beam system having a laser beam therein and a first antenna electrically connected to the laser beam system, and a marker comprising a second antenna, wherein the marker is wirelessly connected to location tracking means for determining a position of the marker, wherein the position of the marker is wirelessly sent to the laser beam system for proper alignment of the laser beam toward the marker.

In an embodiment, the location tracking means wirelessly connected to the marker is a GPS-tracking system.

In an embodiment, the location tracking means wirelessly connected to the marker is a cellular-tower tracking system.

In an embodiment, the position of the target location is at a position offset a distance from the position of the marker.

In an embodiment, the first antenna and the second antenna are positioned to have clear wireless connections with the location tracking means.

In an embodiment, the laser beam system comprises a housing having a stabilizing element, wherein the stabilizing element stabilizes the housing on a surface.

In an embodiment, the laser beam system comprises at least one controller for controlling the direction of the laser beam.

In an embodiment, the laser beam system further comprises a display screen showing a targeting representation thereon.

In an embodiment, the targeting representation comprises a target icon representing the target location associated with the marker.

In an embodiment, the targeting representation comprises a laser beam icon showing an actual position of the laser beam, and further comprising at least one controller configured to move the laser beam icon on the display to match the position on the display of the target icon.

In an alternate embodiment of the present invention, a method of positioning a laser beam within a pipe trench is provided. The method comprises the steps of: providing a laser beam system having a laser beam therein and a first antenna electrically connected to the laser beam system, and a marker comprising a second antenna, wherein the marker is wirelessly connected to location tracking means for determining a position of the marker; sending the position of the marker, via the location tracking means, to the laser beam system; calculating a position of a target location based on the position of the marker; and aligning the laser beam of the laser beam system to the target location calculated from the position of the marker.

In an embodiment, the location tracking means that is wirelessly connected to the marker is a GPS-tracking system.

In an embodiment, the location tracking means that is wirelessly connected to the marker is a cellular-tower tracking system.

In an embodiment, the position of the target location is at a position offset a distance from the position of the marker.

In an embodiment, the method further comprises the step of: positioning the first antenna and the second antenna to have clear wireless connections with the location tracking means.

In an embodiment, the laser beam system comprises a housing having a stabilizing element, wherein the stabilizing element stabilizes the housing on a surface.

In an embodiment, the laser beam system comprises at least one controller for controlling the direction of the laser beam, and further comprising the step of: controlling the direction of the laser beam with the controller.

In an embodiment, the laser beam system further comprises a display screen showing a targeting representation thereon.

In an embodiment, the targeting representation comprises a target icon representing the target location associated with the marker.

In an embodiment, the targeting representation comprises a laser beam icon showing an actual position of the laser beam, and further comprising at least one controller configured to move the laser beam icon on the display to match the position on the display of the target icon, and further comprising the step of: controlling the laser beam icon on the display with the controller to match the position of the target icon on the display.

It is, therefore, an advantage and objective of the present invention to provide an improved laser-guided positioning system for positioning pipes.

More specifically, it is an advantage and objective of the present invention to provide a laser-guided positioning system that minimizes positioning errors when the laser-guided positioning system is utilized for positioning pipes.

Moreover, it is an advantage and objective of the present invention to provide an improved laser-guided positioning system that may utilize GPS tracking of a marker so that a laser beam may remain in precise alignment with the marker.

In addition, it is an advantage and objective of the present invention to provide an improved laser-guided positioning system for positioning pipes within a trench that removes or minimizes errors that may be caused by improper sighting by users thereof.

Further, it is an advantage and objective of the present invention to provide an improved laser-guided positioning system for positioning pipes within a trench that is easy to set up and utilize.

Still further, it is an advantage and objective of the present invention to provide an improved laser-guided positioning system for positioning pipes within a trench that can self-correct when misaligned due to movement of the laser beam by human or natural causes.

Additional features and advantages of the present invention are described in, and will be apparent from, the detailed description of the presently preferred embodiments and from the drawings.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE PRESENTLY PREFERRED EMBODIMENTS

The present invention relates to a GPS-guided laser pipe positioning system and methods of using the same. More specifically, a target marker is placed a distance from a laser beam source and the target marker has a GPS tracker thereon, wherein the laser beam source tracks the precise location of the target marker through the GPS tracker. The laser beam is then aimed at the location of the GPS tracker, or at a location an offset distance, such as displaced vertically downward under the ground such that the laser beam is aimed at the location within a trench for positioning pipe therein.

Figure 1:
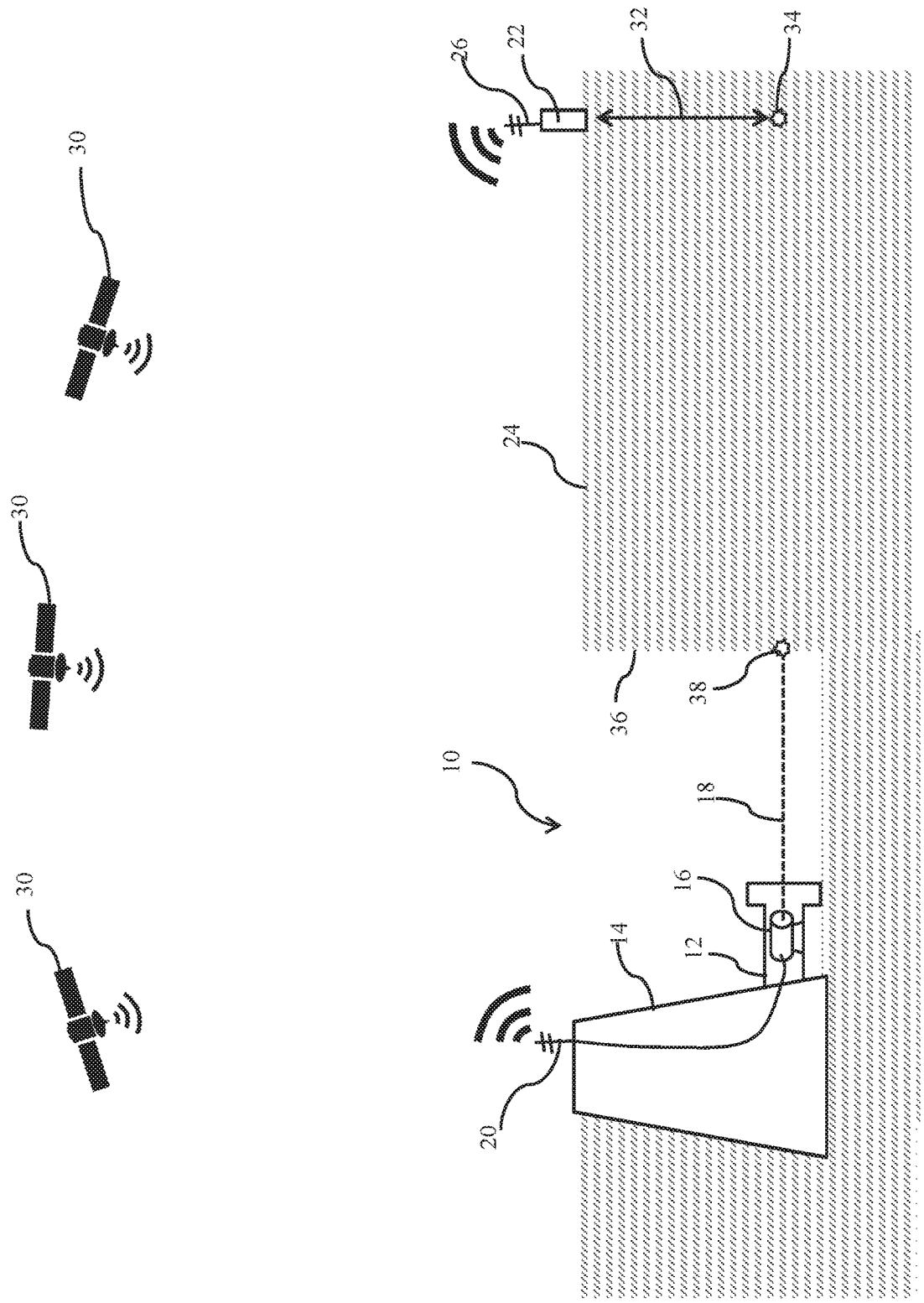
FIG. 1 illustrates a side view of a GPS-guided laser pipe positioning system in an embodiment of the present invention.

As illustrated in FIG. 1, a GPS-guided laser pipe positioning system is shown and described in an embodiment of the present invention. Specifically, a trench 10 is shown having a segment of pipe 12 that may be connected to a structure 14, such as a riser, or sewer access or other like access as apparent to one of ordinary skill in the art. Typically, a structure may provide a convenient location to begin laying pipe, and typically pipe is positioned within the trench 10 between structures.

To ensure that the pipe is positioned linearly and with the proper grade and direction, according to platted plans, a laser beam system 16 may be utilized to shine a laser beam 18 in the direction that the pipe should be positioned and run. Oftentimes, the laser beam is manually set in the direction of a stake or other marker that is a distance from the laser beam. However, since the stake or marker is typically above ground, and therefore the laser beam cannot shine directly at the marker, an offset must be determined so that the laser beam is positioned within the trench and directed at where the pipe should run, such as at a trench wall, as opposed to the surface of the ground. As noted above, aiming the laser beam toward the stake or marker, and then properly configuring the offset so that the laser beam directs the run of pipe properly within the trench is often very difficult, and mistakes can be costly and time-consuming to fix.

In a preferred embodiment of the present invention, the laser beam system 16 may be electrically connected to an antenna 20 that is wirelessly connected to GPS satellites. Preferably, the antenna 20 may be outside of the trench 10 so that the antenna 20 has a clear view of the sky without impediments so that it may interact with the satellites 30. The GPS satellites 30 provide location detection of a marker 22 that is placed on the surface of the ground 24 a distance away from the laser beam and, thus, the start of the pipe run in the direction of the marker 22. The marker 22 further has an antenna 26 providing wireless detection of the marker by the GPS satellites 30. Therefore, the precise position of the marker 22 can be detected by the GPS satellites 30 and sent to the laser beam system 16 via antenna 20, thereby providing the laser beam system 16 the precise physical location of the marker 22.

At least three satellites 30 are typically required for triangulation of the marker 22, but more satellites 30 than three may be used for more accurate detection and positioning information of the marker 22, and the present invention should not be limited as described herein. The use of twenty-one GPS satellites, for example, may provide highly accurate and precise positioning information of the marker 22 so that the pipe 12 may be positioned as accurately and precisely as possible.

In addition, although the use of GPS satellites is described herein for determining an accurate position of the marker 22, other systems may be utilized in replacement of the GPS satellites or together with the GPS satellites to provide precise positioning information concerning the marker 22. For example, cellular telephone towers (not shown) may be utilized to triangulate the position of the marker 22, as apparent to one of ordinary skill in the art.

A vertical offset 32 may be calculated and input into the laser beam system 16 so that the laser beam 18 may shine in the direction of a virtual target 34 that is positioned under the marker 22. Therefore, the laser beam 18 shines across the trench and strikes a wall 36 of the trench 10 at a target position 38, as illustrated in FIG. 1.

Once the virtual target 34 is locked in the laser beam system 16, the laser beam 18 may always point in the proper direction toward the virtual target 34, thereby providing a constant and continuously accurate line on which the pipe may be positioned and run. Specifically, users utilize the direction of the laser beam 18 and the target position 38 to accurately and efficiently position pipe theretowards, wherein as the trench 10 is dug and expanded beyond what is shown in FIG. 1 toward the marker 22, the laser beam continues to show where to position the pipe run.

The laser beam system 16 may receive continuous or nearly continuous GPS positioning information of the marker 22 throughout the process of digging the trench 10 and positioning the subsequent pipes therein. Thus, users can be assured that the laser beam continuously shows the direction to run the pipe. The laser beam system 16 may further have controls that allow a user to ensure that the laser beam 18 remains properly pointed. Thus, in the event that the laser beam system 16 moves, whether accidentally through contact from a user or through natural movement of the earth, the laser beam may be adjusted to ensure that it is always pointed at the target position 38 to which the pipe is to be positioned.

Figure 2:
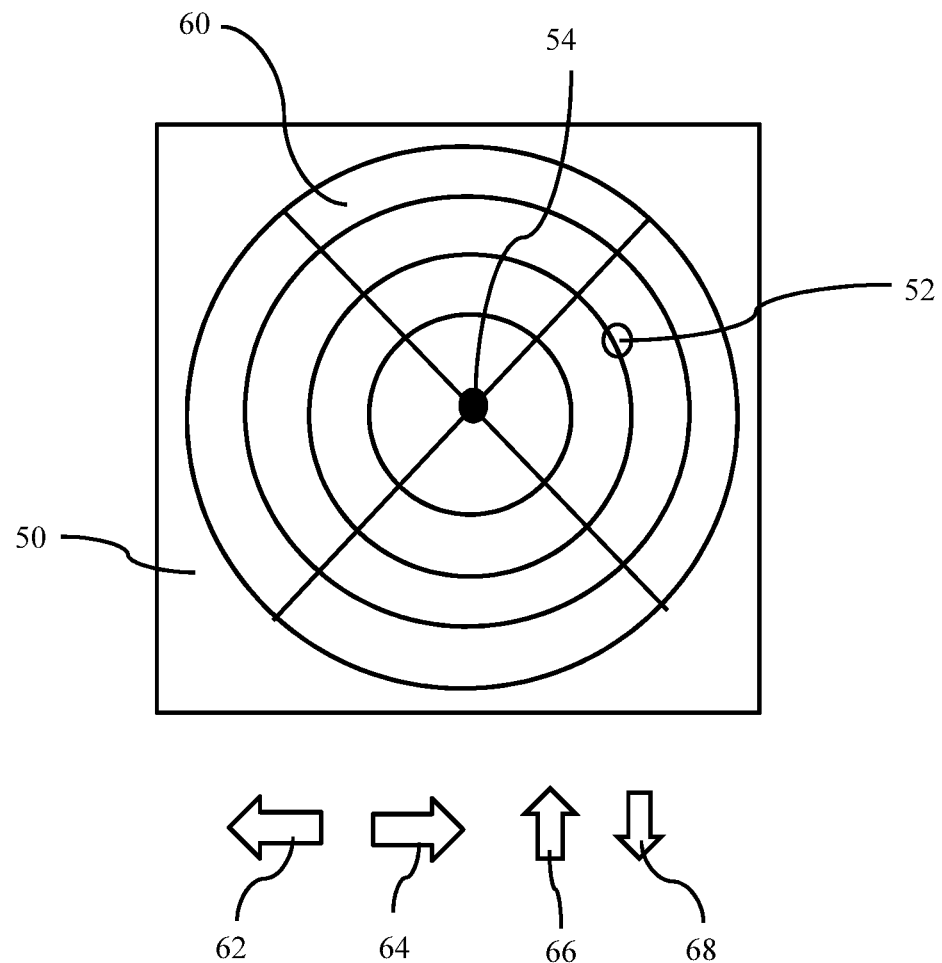
FIG. 2 illustrates a graphical representation of a display screen showing a targeting system for aligning a laser beam to a target.

For example, controls on the laser beam system 16 may allow a user to manually ensure that the laser beam is pointed in the proper direction. Specifically, as illustrated in FIG. 2 a screen 50 on the laser beam system 16 or on a computer screen associated with the laser beam system 16, may be presented to a user showing a graphic 60 showing a targeting representation, a target icon 52 displayed on the screen 50 that shows the actual target position 38 (against the trench wall 36) to which the laser beam 18 should be pointed, and an actual position icon 54 of the laser beam 18 to indicate whether the laser beam 18 is not pointing at the actual target position 38. The display 50 may utilize a camera to show where, on the trench wall, for example, the laser beam should be pointing and where it actually is pointing.

If the actual position icon 54 is offset from the target icon 52, the user may then use the controls 62, 64, 66, 68 (either left (62)/right (64) and/or up(66)/down (68) arrows) or a joystick (not shown), or any other means for controlling the laser beam 18, thereby moving the laser beam 18 to properly point at the actual target position 38. Thus, the laser beam system 16 may have manual dials or motorized positioning means for moving the laser beam 18 in the X direction (horizontally) or the Y direction (vertically).

In an alternate and preferred embodiment of the present invention, the direction of the laser beam 18 and the target position 38 may be monitored via a computer control system (not shown) associated and connected to the laser beam system 16 that the computer control system can automatically adjust the position of the laser beam 18 so that it continuously and properly points at the correct location, the target position 38.

Therefore, if the laser beam system 16 is accidentally moved, bumped, knocked, or otherwise causes the laser beam 18 to not point at the proper position 38, the computer control system may utilize automatic motorized controls to adjust the laser beam 18 in the X direction and the Y direction to properly align the laser beam 18 with the target position 38 on the trench wall 36. A visible or audible alarm may also alert others that the laser beam is not properly positioned and that work should be halted until the laser beam can be either manually or automatically set properly, as described above.

Other calculations may be input or automatically calculated by the laser beam system 16 in the event that other considerations must be taken. Specifically, the marker 22 may be provided for laying pipe, but depending on the actual pipe being positioned, adjustment may be required for connecting with structures, such as other drain tiles, surface sewer grates, manhole covers for access, or for other like purposes. For example, adjustments may be required for properly setting pipe and structures, especially in consideration of roadways that may be above ground, and structures may be required to be set. Specifically, "edge of pavement" and "back of curb" adjustments are often frequently made so that pipe may be properly positioned underground. These adjustments may be automatically calculated or input by a user. Calculations may further be made to adjust to different sizes manhole covers or other like structures as well. As pipe and various structures are typically sized according to standards, the various adjustments that may be needed may be automatically calculated based on user inputs of the standard structures. Alternatively, users may manually enter offset calculations and adjustments as necessary.

In a further non-limiting embodiment of the present invention, the marker 22 may be utilized with a mobile guide (not shown) that may be utilized in a non-laser application, such as to aid in setting pipes without the use of lasers. Specifically, the position of the marker 22 may be relayed to the mobile guide, wherein the mobile guide may be placed in a location that aids a user in laying a pipe, such as a pipe that must be positioned without the benefit of a laser beam guide.

For example, a water main may require positioning within a trench, and similar to the sewer line discussed above, must be positioned in alignment with a terminal position a distance from its starting position. As with the sewer lines, positioning of the water mains is often difficult to ensure that they go where they should be within an excavated trench. However, unlike with a sewer line, water mains typically cannot hold a laser apparatus, as described above, and therefore the laser system described herein is not useful.

The mobile guide, however, may allow a user to tell how to position a pipe, relative to the marker 22, by placing the mobile guide on the pipe for positioning the same. For example, a user may place the mobile guide onto the front end of a water pipe, and its position relative to the marker 22 may inform a user whether to change the positioning of the water pipe. For example, when laying a section of pipe from a valve, the user may place the mobile guide on the front of the pipe, and the mobile guide may inform the user where to place the front of the pipe so that it may be precisely positioned in the direction of the water main's termination point, such as toward the marker 22, but including an offset below ground.

Specifically, the marker 22 may provide its accurate position to the mobile guide, and a computer associated therewith may calculate an actual below-ground position toward which the water pipes should be aligned. The mobile guide may be placed on the front of each pipe during positioning thereof to determine the exact positioning of the end of the pipe relative to the marker 22 and the offset. Once positioned, the next pipe may be positioned in the same manner until the water main is completed.

In yet another embodiment of the present invention, the marker 22 may be utilized for a boring tool (not shown) that may utilize the screen 50, or a similar screen, to ensure that the boring tool is continuously pointed in the proper direction as the boring tool bores through dirt. For example, marker 22 may be placed a distance from the start of the boring tool, and the boring tool itself may receive location information of the marker 22 via the GPS system, as described above. As the boring tool moves through the earth, a target display may show a virtual below ground target to which the boring tool should be pointed. A sensor in the head of the boring tool may be utilized to determine whether the boring tool is pointed directly at the virtual target, and thus, the boring tool may be precisely controlled to bore towards the virtual target.

It should be noted that various changes and modifications to the presently preferred embodiments described herein will be apparent to those skilled in the art. Such changes and modifications may be made without departing from the spirit and scope of the present invention and without diminishing its attendant advantages. References throughout the specification to "the invention" are non-limiting, and it should be noted that claim limitations presented herein are not meant to describe the invention as a whole. The invention illustratively disclosed herein suitably may be practiced in the absence of any element which is not specifically disclosed herein.

I claim:

1. A laser pipe positioning system comprising:
a laser beam system having a laser beam therein and a first antenna electrically connected to the laser beam system; and
a marker comprising a second antenna,
wherein the marker is wirelessly connected to location tracking means for determining a position of the marker, wherein the position of the marker is wirelessly sent to the laser beam system for proper alignment of the laser beam to a target location calculated from a position of the marker.

2. The laser pipe positioning system of claim 1 wherein the location tracking means wirelessly connected to the marker is a GPS-tracking system.

3. The laser pipe positioning system of claim 1 wherein the location tracking means wirelessly connected to the marker is a cellular-tower tracking system.

4. The laser pipe positioning system of claim 1 wherein the position of the target location is at a position offset a distance from the position of the marker.

5. The laser pipe positioning system of claim 1 wherein the first antenna and the second antenna are positioned to have clear wireless connections with the location tracking means.

6. The laser pipe positioning system of claim 1 wherein the laser beam system comprises a housing having a stabilizing element, wherein the stabilizing element stabilizes the housing on a surface.

7. The laser pipe positioning system of claim 1 wherein the laser beam system comprises at least one controller for controlling the direction of the laser beam.

8. The laser pipe positioning system of claim 1 wherein the laser beam system further comprises a display screen showing a targeting representation thereon.

9. The laser pipe positioning system of claim 8 wherein the targeting representation comprises a target icon representing the target location associated with the marker.

10. The laser pipe positioning system of claim 9 wherein the targeting representation comprises a laser beam icon showing an actual position of the laser beam, and further comprising at least one controller configured to move the laser beam icon on the display to match the position on the display of the target icon.

11. A method of positioning a laser beam within a pipe trench, comprising the steps of:
providing a laser beam system having a laser beam therein and a first antenna electrically connected to the laser beam system, and a marker comprising a second antenna, wherein the marker is wirelessly connected to location tracking means for determining a position of the marker;

sending the position of the marker, via the location tracking means, to the laser beam system;
calculating a position of a target location based on the position of the marker; and
aligning the laser beam of the laser beam system to the target location calculated from the position of the marker.

12. The method of claim 11 wherein the location tracking means that is wirelessly connected to the marker is a GPS-tracking system.

13. The method of claim 11 wherein the location tracking means that is wirelessly connected to the marker is a cellular-tower tracking system.

14. The method of claim 11 wherein the position of the target location is at a position offset a distance from the position of the marker.

15. The method of claim 11 further comprising the step of:
positioning the first antenna and the second antenna to have clear wireless connections with the location tracking means.

16. The method of claim 11 wherein the laser beam system comprises a housing having a stabilizing element, wherein the stabilizing element stabilizes the housing on a surface.

17. The method of claim 11 wherein the laser beam system comprises at least one controller for controlling the direction of the laser beam, and further comprising the step of:
controlling the direction of the laser beam with the controller.

18. The method of claim 11 wherein the laser beam system further comprises a display screen showing a targeting representation thereon.

19. The method of claim 18 wherein the targeting representation comprises a target icon representing the target location associated with the marker.

20. The method of claim 19 wherein the targeting representation comprises a laser beam icon showing an actual position of the laser beam, and further comprising at least one controller configured to move the laser beam icon on the display to match the position on the display of the target icon, and further comprising the step of:
controlling the laser beam icon on the display with the controller to match the position of the target icon on the display.

* * * * *